May 27, 1930.  A. BIZZARRI  1,760,109
INDEPENDENTLY MOUNTED VEHICLE WHEEL
Filed Sept. 2, 1927
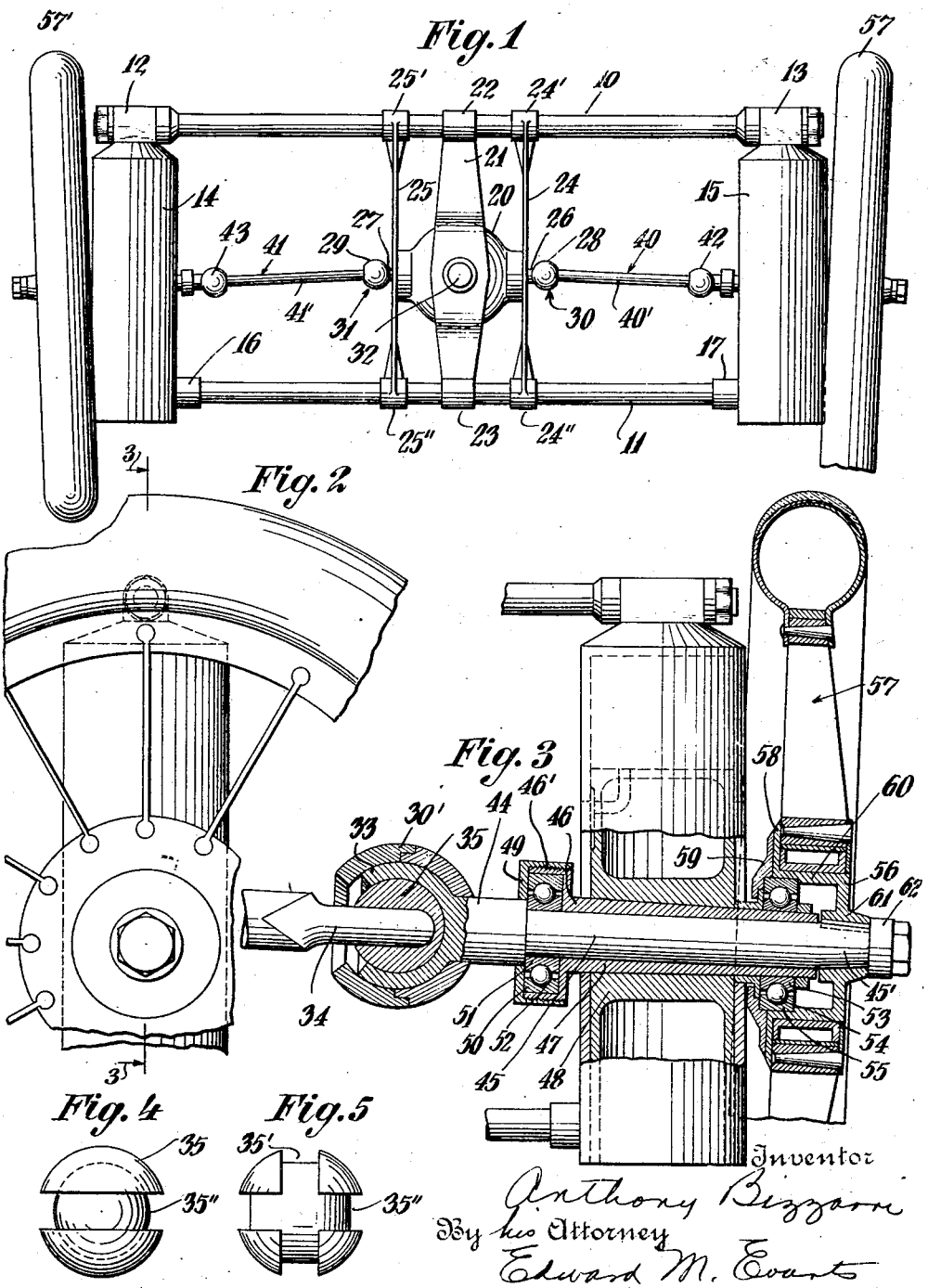
Inventor
Anthony Bizzarri
By his Attorney
Edward M. Evarts Patented May 27, 1930

1,760,109

UNITED STATES PATENT OFFICE

ANTHONY BIZZARRI, OF NEW YORK, N. Y.

INDEPENDENTLY-MOUNTED VEHICLE WHEEL

Application filed September 2, 1927. Serial No. 217,225.

My present invention relates to vehicle wheels, particularly, but not necessarily, such as are adapted for use with automobiles and like vehicles, and especially, but not necessarily, the driving wheels of such vehicles, and aims to devise vehicle wheels of the general character specified which are so constructed and mounted as to permit the independent movement of the wheels under the driving stresses and in response to irregularities and unevennesses of the road bed over which the vehicle is driven, in this way to prevent the disadvantages which are inherent in the usual types of vehicle wheels in which the wheels are not so constructed and mounted as to accommodate independently of each other for the driving stresses and the irregularities of the road bed. In the form which is being here shown and described for purposes of illustration only, the vehicle wheels, particularly the driving wheels, are shown so connected to the propeller shaft sections and the latter are shown so connected to the differential, as to permit each of the wheels to respond independently to the driving stresses and irregularities of the road bed without necessarily affecting the other wheels. This independent accommodation of the wheels to the irregularities of the road bed is accomplished without in any way interfering with the driving action or in any way reducing its efficiency. Other objects and advantages of the devices of the present invention will in part be pointed out in detail hereinafter and will in part be obvious to those skilled in the art to which the present invention relates.

In the accompanying specification I shall describe, and in the annexed drawing show, an illustrative embodiment of the present invention. It is, however, to be clearly understood that my invention is not limited to the specific embodiment thereof herein shown and described for purposes of illustration only.

Referring to the drawing, wherein I have shown the aforesaid illustrative embodiment of the present invention:

Fig. 1 is a rear elevation of an automobile or like vehicle, the driving wheels of which embody the principles of the present invention;

Fig. 2 is a fragmentary side view, on an enlarged scale, of one of the vehicle wheels and associated parts;

Fig. 3 is a cross sectional view, partly broken away, also shown on an enlarged scale, taken along the line 3—3 of Fig. 2 of the drawing, and showing one of the vehicle wheels, the suspension for the same and the associated universal joint;

Fig. 4 is a side elevation of one member of one of the universal joints; and

Fig. 5 is an end view of the member of one of the universal joints shown in Fig. 4 of the drawing.

Referring now to the aforesaid illustrative embodiment of the present invention, and more partcularly to the drawing illustrating the same, 10 indicates the upper and 11 the lower member of a portion of the framework of the suspension. The member 10 has the ends 12 and 13 to which are rigidly and securely attached the suspension cylinders 14 and 15, respectively. The member 11 has the ends 16 and 17 to which are likewise attached the other ends of the suspension cylinders 14 and 15, respectively. I prefer that the cylinders 14 and 15 shall at all times remain substantially vertical and parallel and shall be in fixed relation to each other and to the supporting and spacing members 10 and 11. I prefer, also, that the members 10, 11, and 14, 15, shall form a substantially rigid and relatively inflexible rectangle for the proper operation and support of the remaining parts of the device.

At 20 I have indicated a differential or equivalent driving mechanism. It is clear that where the vehicle, for example, is electrically driven, another type of driving mechanism may be employed. It is further to be understood that the power unit forms no part of the present invention and also that each of the wheels may be independently driven, if so desired.

The differential 20, which, in the present case, is of the usual or ordinary type of construction, is carried by the portion 21 constituting an extension of the differential housing and being rigidly attached at the ends 22 and 23 to the members 10 and 11, respectively, of the framework of the suspension. At 24 and 25 I have indicated additional supports for the differential 20, these supports having their ends 24′, 24″, and 25′, 25″, respectively, securely attached to the members 10 and 11 of the framework of the suspension.

26 and 27 indicate the stub shafts leading from the differential and providing power for driving the wheels. Attached to or forming parts of the stub shafts 26 and 27 are the outer members 28 and 29, respectively, of universal joints generally designated by reference characters 30 and 31, respectively. It may here be stated that 32 indicates the driving shaft leading from the gas engine or other primary source of power.

While the universals 30 and 31 may be of any desired or suitable construction, I prefer that the same shall be constructed as shown in the drawing, particularly in Figs 3, 4 and 5 of the drawing, where one of the universal joints is illustrated on an enlarged scale in detail. As there illustrated, 33 and 34 indicate the pair of forks which hold between them and are received by the rubber, steel or other bearing member or ball 35 provided with the rectangular grooves 35′ and 35″, these grooves being substantially at right angles to each other and receiving the forked ends of the respective forks 33 and 34. One of the forks is rigidly attached to either the differential stub shaft or with one of the jack shafts shortly to be described, while the other fork is rigidly attached to or forms a part either of the wheel spindle or the jack shaft, as the case may be, all as will be readily apparent to those skilled in the art to which the present invention relates, 30′ indicates a dust cap for the differential.

40 and 41 indicate the jack shafts which are preferably splined, as indicated at 40′ and 41′, respectively, to compensate for the varying length between the respective pairs of universal joints. The jack shafts 40 and 41 terminate, at their inner ends, in the universal joints 28 and 29, already described. At their outer ends the jack shafts terminate in the universal joints 42 and 43, respectively, preferably constructed in the same manner as the universal joints 30 and 31 already described.

The fork 33 of each of the universal joints 42 and 43 already described forms a part of or is rigidly attached to a portion 44 of the driving spindle 45. Each driving spindle 45 is provided with the tapered sleeve 46 which is held tightly in the correspondingly tapered aperture 47 in the piston 48 which is adapted to have an up-and-down movement within the piston cylinder 14 or 15, as the case may be. The piston cylinders 14 and 15 and the pistons 48 contained therein constitute air suspensions for the wheels, these suspensions being no part of the present invention, but being more fully described and being fully claimed in my copending application filed of even date herewith and entitled "Vehicle bodies". It may here be stated that in place of the air suspension shown in the drawing, any other suitable type of suspension may be employed, such as the well-known spring or other suspensions.

At its inner end each of the sleeves 46 carries the cup-shaped member 46′, the outer face of which is threaded and the threaded portion of which receives the dust cap 49. At 50 I have indicated a ball bearing, preferably of the radial type. The inner race 51 of the ball bearing 50 is securely and snugly fitted onto the spindle shaft 45, while the outer race 52 has a running fit in the cup-shaped end 46′ of the sleeve 46.

At its other end the sleeve 46 securely or snugly carries the inner race 53 of a ball bearing 54, also preferably of the radial type, the outer race 55 of such ball bearing having a running fit in the hub 56 of the wheel 57. The hub or cap 56 preferably comprises the inner flange 58 against which the inner face of the wheel bears, 59 indicating the inner dust cap which is in contact with the hub flange 58. 60 indicates the main portion of the hub and 61 indicates the outer tapered portion of the hub which is secured to the outer tapered portion 45′ of the spindle 45. The hub 56 carrying the wheel 57 is securely attached to the spindle 45 by means of keys or other locking mechanism 62 of any desired construction and preferably comprising a plurality of keys at right angles, as will readily occur to those skilled in the art to which the present invention relates.

Any desired form of wheel may be utilized, whether of pneumatic, solid or any other type. It may here be stated that the particular form of wheel herein shown, while forming no part of the present invention, is more fully described and is fully claimed in a copending application of mine, Serial No. 146,304, filed November 5, 1926, and entitled "Wheels".

This completes the description of the aforesaid illustrative embodiment of the present invention. The construction of such embodiment will, it is believed, be clear from the foregoing description. Likewise the manner of constructing and assembling said embodiment will be clear from the foregoing description. In operation, it is important to note that while the sleeve 46 is held tightly by and is in fact rigid with the piston 48 and may even be brazed or otherwise rigidly secured thereto, the spindles 45 rotate freely and without friction within the sleeves 46 suitably carried by and suspended from the ball bearings 50 and 53, on the inner and outer ends, respectively, of the spindles 45.

In use, in normal position of the vehicle, on a substantially flat road bed, with the vehicle traveling in a substantially rectilinear direction, the jack shafts will, as shown, be slightly inclined, the inner ends of the jack shafts being above or higher than the outer ends, to compensate for the load which the vehicle is intended to carry and to compensate, also, for the oscillations of the wheel due to variations in the road bed. Under these conditions the suspension is so adjusted as to maintain, within feasible limits, a substantially rectilinear alignment of the jack shafts 40 and 41, the wheels 57 and 57', being slightly inclined towards the center of gravity of the vehicle.

Assuming now that, still with a substantially level road bed, the vehicle is to make a turn either to the right or to the left, the operation under these conditions will be substantially the same as for the usual type of differential transmission, as is also true where the vehicle is traveling in a substantially rectilinear line over a flat road bed.

Assuming now that one of the wheels, as the wheel 57, strikes an obstruction or elevation in the road bed. By the provision of the universals 28 and 42 and the mounting for the wheel, this wheel, without unnecessary shock and without placing too much strain on the suspension and on the transmission, will accommodate itself readily to the irregularity of the road bed independently of the other wheels. In other words, the introduction of the universals 28 and 42 into the structure of the jack shaft 40 will cause the jack shaft and the universal to accommodate themselves to the stresses to which the wheel is subjected by the irregularities in the road bed. This is done without interfering with the normal operation and relations of the parts involving the wheel 57' and its particular jack shaft and the other wheels and their particular jack shafts. It may here be stated that the jack shafts operate in the same plane, which is substantially a vertical plane.

The operation of the device as described above for an obstruction or elevation in the road bed, is substantially the same, except that the direction of the movement of the parts is reversed with respect to the suspension, where the wheel strikes a depression in the road bed. The same operation, of course, applies to the other wheels.

It may here be stated that either two or all four of the wheels of the vehicle may be constructed as above shown and described. In other words, one or more units or pairs of wheels, constructed as shown in the drawing, may be embodied in the vehicle, any number of pairs being employed, as desired.

What I claim as my invention is:

1. In a vehicle, a suspension piston, a sleeve having a tapered channel therein, a wheel spindle having a tapered intermediate portion passing transversely through said tapered channel, and a ball bearing race mounted on the outer end of said spindle.

2. In a vehicle, a suspension piston, a sleeve having a tapered channel therein, a wheel spindle having a tapered intermediate portion passing transversely through said tapered channel, a universal joint mounted on the inner end of said spindle, and a ball bearing race mounted on the outer end of said spindle.

3. In a vehicle, driving means comprising a differential provided with a plurality of oppositely disposed stub shafts, a plurality of cooperating splined jack shafts, a universal joint interposed between each stub shaft and its cooperating jack shaft, a plurality of cooperating wheel spindles, and a universal joint interposed between each jack shaft and its cooperating wheel spindle.

4. In a vehicle, driving means provided with a plurality of oppositely disposed stub shafts, a plurality of cooperating jack shafts, a universal joint interposed between each stub shaft and its cooperating jack shaft, a plurality of cooperating wheel spindles, a piston supported by a cylinder (as a guide) which in turn supports a spindle, attached to one end of which is a universal joint, whose other stub end is connected to splined jack shaft.

5. In a vehicle, driving means comprising a differential provided with a plurality of oppositely disposed stub shafts, a plurality of cooperating splined jack shafts, a universal joint interposed between each stub shaft and its cooperating jack shaft, a plurality of cooperating wheel spindles, a piston supported by a cylinder (as a guide), which in turn supports a spindle, attached to one end of which is a universal joint, whose other stub end is connected to splined jack shaft.

6. In a vehicle, a relatively rigid suspension frame, driving means substantially rigidly mounted in said frame, a plurality of suspension cylinders substantially rigidly carried by said frame, a plurality of oppositely disposed stub shafts associated with and operable by said driving means, a plurality of cooperating jack shafts, a universal joint interposed between each stub shaft and its cooperating jack shaft, a plurality of cooperating wheel spindles, and a universal joint interposed between each jack shaft and its cooperating wheel spindle.

7. In a vehicle, a relatively rigid suspension frame, driving means comprising a differential substantially rigidly mounted in said frame, a plurality of suspension cylinders substantially rigidly carried by said frame, a plurality of oppositely disposed stub shafts associated with and operable by said driving means, a plurality of cooperating splined jack shafts, a universal joint interposed between each stub shaft and its cooperating jack shaft, a plurality of cooperating wheel spindles, and a universal joint interposed between each jack shaft and its cooperating wheel spindle.

8. In a vehicle, a relatively rigid suspension frame, driving means substantially rigidly mounted in said frame, a plurality of suspension cylinders substantially rigidly carried by said frame, a plurality of oppositely disposed stub shafts associated with and operable by said driving means, a plurality of cooperating jack shafts, a universal joint interposed between each stub shaft and its cooperating jack shaft, a plurality of cooperating wheel spindles, a piston supported by a cylinder (as a guide), which in turn supports a spindle, attached to one end of which is a universal joint, whose other stub end is connected to splined jack shaft, and adapted to reciprocate within the corresponding suspension cylinder.

9. In a vehicle, a relatively rigid suspension frame, driving means comprising a differential substantially rigidly mounted in said frame, a plurality of suspension cylinders substantially rigidly carried by said frame, a plurality of oppositely disposed stub shafts associated with and operable by said driving means, a plurality of cooperating splined jack shafts, a universal joint interposed between each stub shaft and its cooperating jack shaft, a plurality of cooperating wheel spindles, a piston supported by a cylinder (as a guide), which in turn supports a spindle, attached to one end of which is a universal joint, whose other stub end is connected to splined jack shaft, and adapted to reciprocate within the corresponding suspension cylinder.

10. In a vehicle, a relatively rigid suspension frame, driving means substantially rigidly mounted in said frame, a plurality of suspension cylinders substantially rigidly carried by said frame, a plurality of oppositely disposed stub shaft associated with and operable by said driving means, a plurality of cooperating jack shafts, a universal joint interposed between each stub shaft and its cooperating jack shaft, a plurality of cooperating wheel spindles each having an intermediate portion thereof tapered, a piston supported by a cylinder (as a guide), which in turn supports a spindle, attached to one end of which is a universal joint, whose other stub end is connected to splined jack shaft, and adapted to reciprocate within the corresponding suspension cylinder, a sleeve carried by each of said suspension pistons and provided with an internally tapered bearing surface for receiving the correspondingly tapered portion of the corresponding jack shaft.

11. In a vehicle, a relatively rigid suspension frame, a driving means substantially rigidly mounted in said frame, a plurality of suspension cylinders substantially rigidly carried by said frame, a plurality of oppositely disposed stub shafts associated with and operable by said driving means, a plurality of cooperating jack shafts, a universal joint interposed between each stub shaft and its cooperating jack shaft, a plurality of cooperating wheel spindles each having an intermediate portion thereof tapered, a sleeve carried by each of said suspension pistons and provided with an internally tapered bearing surface for receiving the correspondingly tapered portion of the corresponding jack shaft, and a universal joint interposed between each jack shaft and its cooperating wheel spindle.

12. In a vehicle, a relatively rigid suspension frame, driving means comprising a differential substantially rigidly mounted in said frame, a plurality of suspension cylinders substantially rigidly carried by said frame a plurality of oppositely disposed stub shafts associated with and operable by said driving means, a plurality of cooperating splined jack shafts, a universal joint interposed between each stub shaft and its cooperating jack shaft, a plurality of cooperating wheel spindles each having an intermediate portion thereof tapered, a piston supported by a cylinder (as a guide), which in turn supports a spindle, attached to one end of which is a universal joint, whose other stub end is connected to splined jack shaft, and adapted to reciprocate within the corresponding suspension cylinder, a sleeve carried by each of said suspension pistons and provided with an internally tapered bearing surface for receiving the correspondingly tapered portion of the corresponding jack shaft.

13. In a vehicle, a relatively rigid suspension frame, driving means comprising a differential substantially rigidly mounted in said frame, a plurality of suspension cylinders substantially rigidly carried by said frame, a plurality of oppositely disposed stub shafts associated with and operable by said driving means, a plurality of cooperating splined jack shafts, a universal joint interposed between each stub shaft and its cooperating jack shaft, a plurality of cooperating wheel spindles each having an intermediate portion thereof tapered, a sleeve carried by each of said suspension pistons and provided with an internally tapered bearing surface for receiving the correspondingly tapered portion of the corresponding jack shaft, and a universal joint interposed between each jack shaft and its cooperating wheel spindle.

In testimony, whereof, I have signed my name to this specification this 9th day of August, 1927.

ANTHONY BIZZARRI.